(12) United States Patent
Wang et al.

(10) Patent No.: US 11,225,533 B2
(45) Date of Patent: Jan. 18, 2022

(54) HYDROGENATION OF NITRILE BUTADIENE RUBBER LATEX

(71) Applicant: ARLANXEO DEUTSCHLAND GMBH, Dormagen (DE)

(72) Inventors: Hui Wang, Ontario (CA); Garry Rempel, Ontario (CA)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 0 days.

(21) Appl. No.: 16/954,558

(22) PCT Filed: Dec. 11, 2018

(86) PCT No.: PCT/EP2018/084325
§ 371 (c)(1),
(2) Date: Jun. 17, 2020

(87) PCT Pub. No.: WO2019/121153
PCT Pub. Date: Jun. 27, 2019

(65) Prior Publication Data
US 2020/0308312 A1    Oct. 1, 2020

(30) Foreign Application Priority Data

Dec. 18, 2017 (EP) .................... 17208061

(51) Int. Cl.
| | | |
|---|---|---|
| *C08C 19/02* | (2006.01) | |
| *B01J 31/22* | (2006.01) | |
| *C08F 236/12* | (2006.01) | |
| *C08K 5/098* | (2006.01) | |

(52) U.S. Cl.
CPC ........... *C08C 19/02* (2013.01); *B01J 31/2208* (2013.01); *B01J 31/2269* (2013.01); *C08F 236/12* (2013.01); *C08K 5/098* (2013.01); *B01J 2231/645* (2013.01); *B01J 2531/821* (2013.01)

(58) Field of Classification Search
CPC .............................. C08C 19/02; C08K 5/098
See application file for complete search history.

(56) References Cited

U.S. PATENT DOCUMENTS

| | | | |
|---|---|---|---|
| 5,021,469 A | 6/1991 | Langerbeins et al. | |
| 5,272,202 A | 12/1993 | Kubo et al. | |
| 5,340,858 A | 8/1994 | Bauer et al. | |
| 5,340,859 A | 8/1994 | Aydin et al. | |
| 5,350,787 A | 9/1994 | Aydin et al. | |
| 5,352,720 A | 10/1994 | Aydin et al. | |
| 5,426,146 A | 6/1995 | Aydin et al. | |
| 5,436,289 A | 7/1995 | Aydin et al. | |
| 5,442,006 A | 8/1995 | Aydin et al. | |
| 5,468,799 A | 11/1995 | Aydin et al. | |
| 5,496,882 A | 3/1996 | Aydin et al. | |
| 5,498,655 A | 3/1996 | Aydin et al. | |
| 5,576,384 A | 11/1996 | Noelken et al. | |
| 5,624,992 A | 4/1997 | Aydin et al. | |
| 5,708,077 A | 1/1998 | Noelken et al. | |
| 5,756,574 A | 5/1998 | Baumstark et al. | |
| 6,403,727 B1 | 6/2002 | Leube et al. | |
| 8,288,558 B2 | 10/2012 | Arlt et al. | |
| 8,536,244 B2 | 9/2013 | Arlt et al. | |
| 2002/0107138 A1 | 8/2002 | Haveyda et al. | |
| 2008/0275174 A1* | 11/2008 | Tao ....................... | C08L 15/005 524/457 |
| 2010/0113795 A1 | 5/2010 | Arlt et al. | |
| 2012/0130005 A1* | 5/2012 | Senda ...................... | C08G 8/22 524/511 |
| 2013/0005916 A1* | 1/2013 | Ong ..................... | C08L 15/005 525/338 |
| 2013/0211096 A1 | 8/2013 | Arlt et al. | |
| 2013/0310484 A1* | 11/2013 | Furukawa ................ | C08L 9/10 523/201 |

FOREIGN PATENT DOCUMENTS

| | | |
|---|---|---|
| CN | 107200796 A | 9/2017 |
| DE | 38 34 734 A1 | 4/1990 |
| DE | 42 13 967 A1 | 11/1993 |
| DE | 42 13 968 A1 | 11/1993 |
| DE | 44 19 518 A1 | 12/1995 |
| DE | 44 35 422 A1 | 4/1996 |
| DE | 44 35 423 A1 | 4/1996 |
| EP | 0 327 006 A2 | 8/1989 |
| EP | 0 379 892 A2 | 8/1990 |
| EP | 0 584 458 A2 | 5/1993 |
| EP | 0 567 811 A1 | 11/1993 |
| EP | 0 567 812 A1 | 11/1993 |
| EP | 0 567 819 A1 | 11/1993 |
| EP | 2 072 532 A1 | 12/2008 |

(Continued)

OTHER PUBLICATIONS

Wei et al., "Direct Catalytic Hydrogenation of an Acrylonitrile-Butadiene Rubber Latex Using Wilkinson's Catalyst"; Macromol. Rapid Commun. 26 (2005) 1768-1772.
Houben Weyl, Methoden der organischen Chemie, vol. XIV/1, Makromolekulare Stoffe, Georg Thieme Verlag, Stuttgart, 1961, pp. 192-208.
Ullmann's Encyclopedia of Industrial Chemistry, 5th Edition, vol. A 21, pp. 373-393.
Extended European Search Report dated Jun. 29, 2018.
Written Opinion from corresponding PCT/EP2018/084325 dated Mar. 15, 2019.

* cited by examiner

*Primary Examiner* — Robert C Boyle
(74) *Attorney, Agent, or Firm* — Norris McLaughlin, P.A.

(57) ABSTRACT

The present invention relates to a process for the hydrogenation of the carbon-carbon double bonds in nitrile butadiene rubber which is present in latex form, this means as a suspension of nitrile butadiene rubber particles in an aqueous medium, using a hydrogenation catalyst in the presence of an emulsifier.

14 Claims, No Drawings

(56) References Cited

FOREIGN PATENT DOCUMENTS

| | | | |
|---|---|---|---|
| EP | 2 072 533 A1 | 12/2008 |
| EP | 2 675 072 A1 | 6/2012 |
| EP | 2 675 969 A1 | 12/2013 |
| EP | 2 675 971 A1 | 12/2013 |
| EP | 2 676 969 A1 | 12/2013 |
| EP | 2 676 971 A1 | 12/2013 |
| EP | 2 675 971 B1 | 3/2017 |
| JP | 2005 206645 A | 8/2005 |
| WO | 00/71554 A2 | 11/2000 |
| WO | 2004/035596 A1 | 4/2004 |
| WO | 2008/034552 A1 | 3/2008 |
| WO | 2011/023788 A1 | 3/2011 |

HYDROGENATION OF NITRILE BUTADIENE RUBBER LATEX

This application is a 371 of PCT/EP2018/084325, filed Dec. 11, 2018, which claims foreign priority benefit under 35 U.S.C. § 119 of the European Patent Application No. 17208061.6, filed Dec. 18, 2017, the disclosures of which are incorporated herein by reference.

FIELD OF THE INVENTION

The present invention relates to a process for the hydrogenation of the carbon-carbon double bonds in unsaturated or partially saturated nitrile butadiene rubbers which are present in latex form, this means as a suspension of nitrile butadiene rubber particles in an aqueous medium, using a hydrogenation catalyst in the presence of an emulsifier.

BACKGROUND OF THE INVENTION

It has been known that carbon-carbon double bonds in nitrile butadiene rubber (NBR) may be successfully hydrogenated by treating the polymer in an organic solution with hydrogen in the presence of different catalysts. Such processes can be selective in the double bonds, which are hydrogenated, so that, the triple bonds between carbon and nitrogen are not affected. This field of art contains many examples of catalysts suitable for such hydrogenations e.g. based on rhodium, ruthenium, osmium, palladium, and iridium.

However, typically NBR-copolymers or -terpolymers are made by emulsion polymerization processes and are therefore obtained in latex form, i.a. as polymer particles suspended in the aqueous medium due to the stabilizing effect of emulsifiers, when they are discharged from polymerization reactors. Therefore it is very desirable to directly hydrogenate a diene-based polymer in said latex form and increasing efforts are spent on such direct hydrogenation in the recent decade.

Several technical routes have been attempted to hydrogenate C=C double bonds in polymers in the form of latex.

U.S. Pat. No. 5,272,202 describes a process for the selective hydrogenation of the carbon-carbon double bonds of an unsaturated, nitrile-group-containing polymer with hydrogen in the presence of a hydrogenation catalyst being a palladium compound. In this process an latex of the unsaturated, nitrile-group-containing polymer is subjected to the hydrogenation. The latex is brought into contact with gaseous or dissolved hydrogen while maintaining an emulsified state.

U.S. Pat. No. 6,403,727 discloses a process for selectively hydrogenating ethylenically unsaturated double bonds in polymers. Said process involves reacting the polymers with hydrogen in the presence of at least one hydrogenation catalyst selected from the salts and complex compounds of rhodium and/or of ruthenium, in an aqueous suspension of the polymers. The suitable rhodium containing catalysts are rhodium phosphine complexes of the formula $RhX_mL^3L^4(L^5)_n$ wherein X is a halide, the anion of a carboxylic acid, acetylacetonate, aryl- or alkylsulfonate, hydride or the diphenyltriazine anion and $L^3$, $L^4$ and $L^5$ independently are CO, olefins, cycloolefins, dibenzophosphol, benzonitrile, $PR_3$ or $R_2P-A-PR_2$, m is 1 or 2 and n is 0, 1 or 2, with the proviso that at least one of $L^3$, $L^4$ or $L^5$ is one of the above mentioned phosphorus-containing ligands of the formula $PR_3$ or $PR_2-A-PR_2$, wherein R is alkyl, alkyloxy, cycloalkyl, cycloalkyloxy, aryl or aryloxy.

In Macromol. Rapid Commun. 26 (2005) 1768-1772 an NBR-latex hydrogenation technique is disclosed by which the rubber latex was directly hydrogenated without the requirements for pretreatment of the latex prior to the hydrogenation. Wilkinson's catalyst and its ligand triphenylphosphine (TPP) were used as a catalyst and co-catalyst respectively. In this study, the added excess TPP plays a crucial role to transport the catalyst into the latex particles. One drawback of this system is that the hydrogenation rate is quite slow, which limits the further development of this technique.

EP-A-2 676 971 discloses that Hoveyda Grubbs $2^{nd}$ generation (HG2) catalyst shows a catalytic activity in the hydrogenation of NBR-latex. After 4 hours hydrogenation reaction at 100° C. and 6.89 MPa hydrogen pressure, the hydrogenation degree reaches 98%. No visible gel was generated in the resultant hydrogenated NBR polymer. However, no examples were disclosed where the hydrogenation of NBR-latex is performed after addition of hydrogenation catalyst and emulsifier to the NBR-latex.

The present invention had the object to provide an improved process allowing the hydrogenation of a nitrile butadiene rubber latex, i.e. present as an aqueous suspension, with a high degree of hydrogenation within short reaction times. A short reaction time is crucial for a commercial process for the hydrogenation of NBR. It was therefore a further, preferred object of the invention to provide an process for hydrogenation of a nitrile butadiene rubber latex until a conversion of 95% within 4 hours with low amounts of catalyst, preferably with catalyst amounts of 0.3 wt.-% or less based on the nitrile butadiene rubber solid content of the latex.

SUMMARY OF THE INVENTION

The present invention provides a process for preparing a hydrogenated nitrile butadiene rubber latex comprising subjecting unsaturated or partially saturated nitrile butadiene rubber latex which is present in aqueous suspension to a hydrogenation in the presence of at least one hydrogenation catalyst (a) and at least one emulsifier (b), characterized in that the hydrogenation catalyst (a) and the emulsifier (b) are added to the aqueous suspension of the nitrile butadiene rubber.

DETAILED DESCRIPTION OF THE INVENTION

The process of the present invention allows a hydrogenation of the carbon-carbon double bonds which are present in a nitrile butadiene rubber latex. This means that double or triple bonds between carbon and other atoms such as nitrogen or oxygen are also not affected.

The term "substituted" used for the purposes of the present patent application means that a hydrogen atom on an indicated radical or atom has been replaced by one of the groups indicated in each case, with the proviso that the valency of the atom indicated is not exceeded and the substitution leads to a stable compound.

For the purposes of the present patent application and invention, all the definitions of radicals, parameters or explanations given above or below in general terms or in preferred ranges can be combined with one another in any way, i.e. including combinations of the respective ranges and preferred ranges.

Nitrile Butadiene Rubber Latex to be Subjected to the Process According to the Invention Suitable substrates for the process of the present invention are in principle all aqueous suspensions of unsaturated or partially saturated nitrile butadiene rubber latex which are also called "NBR-latex" or "parent NBR-latex" this being a copolymer having repeating units of at least one $\alpha,\beta$-unsaturated nitrile (a), preferably acrylonitrile, at least one conjugated diene, preferably 1,3-butadiene (b), and optionally one or more further copolymerizable monomers (c). These lattices include both suspensions prepared by polymerization of aqueous monomer emulsions (primary suspensions) and those whose polymers have been prepared by whatever method or route and are then converted to an aqueous suspension form (secondary suspensions). The term "aqueous suspension" also embraces, in principle, suspensions of microcapsules. Preferably, the process of the present invention uses primary suspensions.

The $\alpha,\beta$-ethylenically unsaturated nitriles (a) can be any known $\alpha,\beta$-ethylenically unsaturated nitriles, preferably a $(C_3-C_5)$ $\alpha,\beta$-ethylenically unsaturated nitrile from the group acrylonitrile, methacrylonitrile, ethacrylonitrile or mixtures thereof. Particular preference is given to acrylonitrile.

The conjugated diene (b) can be of any nature. In one embodiment $(C_4-C_6)$ conjugated dienes are used. Preference is given to 1,3-butadiene, isoprene, 1-methylbutadiene, 2,3-dimethylbutadiene, piperylene, chloroprene, or mixtures thereof. Particular preference is given to 1,3-butadiene and isoprene or mixtures thereof. Especial preference is given to 1,3-butadiene.

In a further embodiment, nitrile butadiene rubber may be subjected to the inventive process which comprise repeating units of not only at least one $\alpha,\beta$-ethylenically unsaturated nitrile (a) and at least one conjugated diene (b) as monomers but additionally at least one further copolymerizable monomer (c).

Examples of suitable copolymerizable monomers (c) are olefins, such as ethylene or propylene, vinylaromatic monomers, such as styrene, alphamethyl styrene, o-chlorostyrene or vinyltoluenes, vinylesters of aliphatic or branched $C_1-C_{18}$ monocarboxylic acids, such as vinyl acetate, vinyl propionate, vinyl butyrate, vinyl valerate, vinyl hexanoate, vinyl 2-ethylhexanoate, vinyl decanoate, vinyl laurate and vinyl stearate.

Further suitable monomers (c) are esters of ethylenically unsaturated mono- or dicarboxylic acids such as acrylic acid, methacrylic acid, maleic acid, fumaric acid and itaconic acid with generally $C_1-C_{12}$ alkanols, such as methanol, ethanol, n-propanol, isopropanol, 1-butanol, 2-butanol, isobutanol, tert.-butanol, n-hexanol, 2-ethylhexanol, or $C_5-C_{10}$ cycloalkanols, such as cyclopentanol or cyclohexanol, and of these preferably the esters of acrylic and/or methacrylic acid, examples being methyl methacrylate, n-butyl methacrylate, tert-butyl methacrylate, n-butyl acrylate, tert-butyl acrylate, and 2-ethylhexyl acrylate.

A particularly preferred nitrile rubber is a copolymer having repeating units derived from acrylonitrile and 1,3-butadiene.

Apart from the conjugated diene and the $\alpha,\beta$-ethylenically unsaturated nitrile, the nitrile rubber may comprise repeating units of one or more further copolymerizable monomers known in the art, e.g. $\alpha,\beta$-ethylenically unsaturated (preferably mono-unsaturated) monocarboxylic acids, their esters and amides, $\alpha,\beta$-ethylenically unsaturated (preferably mono-unsaturated) dicarboxylic acids, their mono-oder diesters, as well as the respective anhydrides or amides of said $\alpha,\beta$-ethylenically unsaturated dicarboxylic acids.

As $\alpha,\beta$-ethylenically unsaturated monocarboxylic acids acrylic acid and methacrylic acid are preferred termonomers of such nitrile rubbers.

Esters of $\alpha,\beta$-ethylenically unsaturated monocarboxylic acids may also be used, in particular alkyl esters, alkoxyalkyl esters, aryl esters, cycloalkylesters, cyanoalkyl esters, hydroxyalkyl esters, and fluoroalkyl esters.

As alkyl esters $C_1-C_{18}$ alkyl esters of the $\alpha,\beta$-ethylenically unsaturated monocarboxylic acids are preferably used, more preferably $C_1-C_{18}$ alkyl esters of acrylic acid or methacrylic acid, such as methylacrylate, ethylacrylate, propylacrylate, n-butylacrylate, tert.-butylacrylate, 2-ethylhexylacrylate, n-dodecylacrylate, methylmethacrylate, ethylmethacrylate, propylmethacrylate, n-butyl methacrylate, tert.-butylmethacrylate and 2-ethylhexyl-methacrylate.

As alkoxyalkyl esters $C_2-C_{18}$ alkoxyalkyl esters of $\alpha,\beta$-ethylenically unsaturated monocarboxylic acids are preferably used, more preferably alkoxyalkylester of acrylic acid or methacrylic acid such as methoxy methyl(meth)acrylate, methoxy ethyl(meth)acrylate, ethoxyethyl(meth)acrylate and methoxyethyl(meth)acrylate.

It is also possible to use aryl esters, preferably $C_6-C_{14}$-aryl-, more preferably $C_6-C_{10}$-aryl esters and most preferably the aforementioned aryl esters of acrylates and methacrylates.

In another embodiment cycloalkyl esters, preferably $C_5-C_{12}$-cycloalkyl-, more preferably $C_6-C_{12}$-cycloalkyl and most preferably the aforementioned cycloalkyl acrylates and methacrylates are used.

It is also possible to use cyanoalkyl esters, in particular cyanoalkyl acrylates or cyanoalkyl methacrylates, in which the number of C atoms in the cyanoalkyl group is in the range of from 2 to 12, preferably $\alpha$-cyanoethyl acrylate, $\beta$-cyanoethyl acrylate or cyanobutyl methacrylate are used.

In another embodiment hydroxyalkyl esters are used, in particular hydroxyalkyl acrylates and hydroxyalkyl methacrylates in which the number of C-atoms in the hydroxylalkyl group is in the range of from 1 to 12, preferably 2-hydroxyethyl acrylate, 2-hydroxyethyl methacrylate or 3-hydroxypropyl acrylate.

It is also possible to use fluorobenzyl esters, in particular fluorobenzyl acrylates or fluorobenzyl methacrylates, preferably trifluoroethyl acrylate and tetrafluoropropyl methacrylate. Substituted amino group containing acrylates and methacrylates may also be used like dimethylaminomethyl acrylate and diethylaminoethylacrylate.

Various other esters of the $\alpha,\beta$-ethylenically unsaturated carboxylic acids may also be used, like e.g. polyethyleneglycol(meth)acrylate, polypropyleneglycole(meth)acrylate, glycidyl(meth)acrylate, epoxy(meth)acrylate, N-(2-hydroxyethyl)acrylamide, N-(2-hydroxymethyl)acrylamide or urethane(meth)acrylate.

It is also possible to use mixture of all aforementioned esters of $\alpha,\beta$-ethylenically unsaturated carboxylic acids.

Furthon $\alpha,\beta$-ethylenically unsaturated dicarboxylic acids may be used, preferably maleic acid, fumaric acid, crotonic acid, itaconic acid, citraconic acid and mesaconic acid.

In another embodiment anhydrides of $\alpha,\beta$-ethylenically unsaturated dicarboxylic acids are used, preferably maleic anhydride, itaconic anhydride, itaconic anhydride, citraconic anhydride and mesaconic anhydride.

In a further embodiment mono- or diesters of $\alpha,\beta$-ethylenically unsaturated dicarboxylic acids can be used. Suitable alkyl esters are e.g. $C_1-C_{10}$-alkyl, preferably ethyl-, n-propyl-, iso-propyl, n-butyl-, tert.-butyl, n-pentyl-oder n-hexyl mono- or diesters. Suitable alkoxyalkyl esters are e.g. $C_2-C_{12}$ alkoxyalkyl-, preferably $C_3-C_8$-alkoxyalkyl monoor diesters. Suitable hydroxyalkyl esters are e.g. $C_1$-$C_{12}$ hydroxyalkyl-, preferably $C_2$-$C_8$-hydroxyalkyl mono- or diesters. Suitable cycloalkyl esters are e.g. $C_5$-$C_{12}$-cycloalkyl-, preferably $C_6$-$C_{12}$-cycloalkyl mono- or diesters. Suitable alkylcycloalkyl esters are e.g. $C_6$-$C_{12}$-alkylcycloalkyl-, preferably $C_7$-$C_{10}$-alkylcycloalkyl mono- or diesters. Suitable aryl esters are e.g. $C_6$-$C_{14}$-aryl, preferably $C_6$-$C_{10}$-aryl mono- or diesters.

Explicit examples of the α,β-ethylenically unsaturated dicarboxylic acid monoester monomers include maleic acid monoalkyl esters, preferably monomethyl maleate, monoethyl maleate, monopropyl maleate, and mono n-butyl maleate;

maleic acid monocycloalkyl esters, preferably monocyclopentyl maleate, monocyclohexyl maleate, and monocycloheptyl maleate;

maleic acid monoalkylcycloalkyl esters, preferably monomethylcyclopentyl maleate, and monoethylcyclohexyl maleate;

maleic acid monoaryl ester, preferably monophenyl maleate;

maleic acid mono benzyl ester, preferably monobenzyl maleate;

fumaric acid monoalkyl esters, preferably monomethyl fumarate, monoethyl fumarate, monopropyl fumarate, and mono n-butyl fumarate;

fumaric acid monocycloalkyl esters, preferably monocyclopentyl fumarate, monocyclohexyl fumarate, and monocycloheptyl fumarate;

fumaric acid monoalkylcycloalkyl esters, preferably monomethylcyclopentyl fumarate, and monoethylcyclohexyl fumarate;

fumaric acid monoaryl ester, preferably monophenyl fumarate;

fumaric acid mono benzyl ester, preferably monobenzyl fumarate;

citraconic acid monoalkyl esters, preferably monomethyl citraconate, monoethyl citraconate, monopropyl citraconate, and mono n-butyl citraconate;

citraconic acid monocycloalkyl esters, preferably monocyclopentyl citraconate, monocyclohexyl citraconate, and monocycloheptyl citraconate;

citraconic acid monoalkylcycloalkyl esters, preferably monomethylcyclopentyl citraconate, and monoethylcyclohexyl citraconate;

citraconic acid mono aryl ester, preferably monophenyl citraconate;

citraconic acid mono benzyl ester, preferably monobenzyl citraconate;

itaconic acid mono alkyl esters, preferably monomethyl itaconate, monoethyl itaconate, monopropyl itaconate, and mono n-butyl itaconate;

itaconic acid monocycloalkyl esters, preferably monocyclopentyl itaconate, monocyclohexyl itaconate, and monocycloheptyl itaconate;

itaconic acid monoalkylcycloalkyl esters, preferably monomethylcyclopentyl itaconate, and monoethylcyclohexyl itaconate;

itaconic acid mono aryl ester, preferably monophenyl itaconate;

itaconic acid mono benzyl ester, preferably monobenzyl itaconate.

As α,β-ethylenically unsaturated dicarboxylic acid diester monomers the analoguos diesters based on the above explicitely mentioned mono ester monomers may be used, wherein, however, the two organic groups linked to the C=O group via the oxygen atom may be identical or different.

As further termonomers vinyl aromatic monomers like styrol, α-methylstyrol and vinylpyridine, as well as non-conjugated dienes like 4-cyanocyclohexene and 4-vinylcyclohexene, as well as alkines like 1- or 2-butine may be used.

As further termonomers PEG acrylate monomers derived from PEG acrylates of the general formula (I)

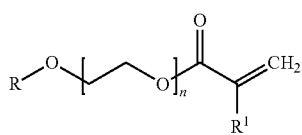

Formula (I)

where R is hydrogen or branched or unbranched $C_1$-$C_{20}$-alkyl, preferably methyl, ethyl, butyl or ethylhexyl, n is 1 to 8, preferably 2 to 8, more preferably 2 to 5 and most preferably 3 and $R^1$ is hydrogen or $CH_3$— may be used.

The term "(meth)acrylate" in the context of this invention represents "acrylate" and "methacrylate". When the $R^1$ radical in the general formula (I) is $CH_3$—, the molecule is a methacrylate. The term "polyethylene glycol" or the abbreviation "PEG" represents both monoethylene glycol sections having one repeat ethylene glycol unit (PEG-1, n=1) and polyethylene glycol sections having 2 to 8 repeat ethylene glycol units (PEG-2 to PEG-8; n=2 to 8). The term "PEG acrylate" is also abbreviated to PEG-X-(M)A where "X" represents the number of repeat ethylene glycol units, "MA" represents methacrylate and "A" represents acrylate. Acrylate monomers derived from PEG acrylates of the general formula (I) are referred to as "PEG acrylate monomers".

Preferred PEG acrylate monomers are selected from the following formulae no. 1 to no. 10, where n is 1, 2, 3, 4, 5, 6, 7 or 8, preferably 2, 3, 4, 5, 6, 7 or 8, more preferably 3, 4, 5, 6, 7 or 8 and most preferably 3:

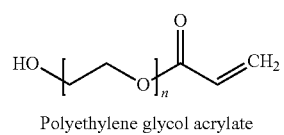

(Formula no. 1)

Polyethylene glycol acrylate

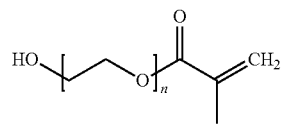

(Formula no. 2)

Polyethylene glycol methacrylate

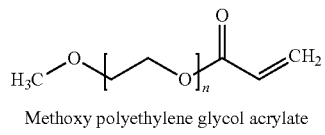

(Formula no. 3)

Methoxy polyethylene glycol acrylate

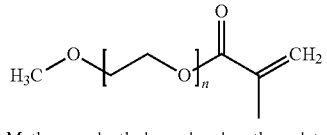

(Formula no. 4)

Methoxy polyethylene glycol methacrylate

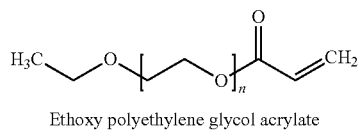

Ethoxy polyethylene glycol acrylate (Formula no. 5)

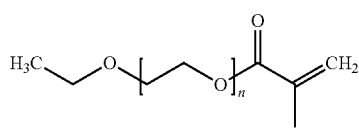

Ethoxy polyethylene glycol methacrylate (Formula no. 6)

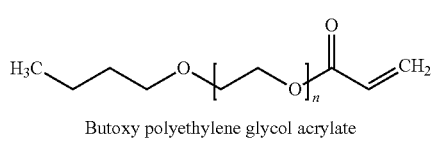

Butoxy polyethylene glycol acrylate (Formula no. 7)

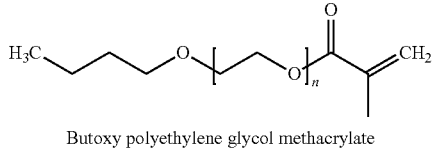

Butoxy polyethylene glycol methacrylate (Formula no. 8)

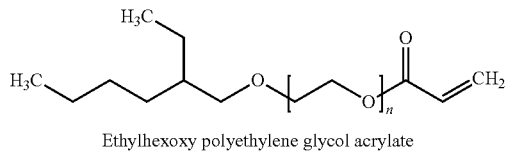

Ethylhexoxy polyethylene glycol acrylate (Formula no. 9)

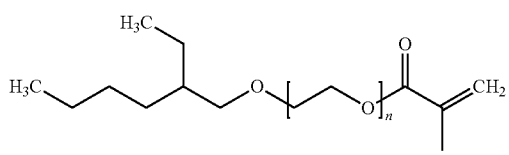

Ethylhexoxy polyethylene glycol methacrylate (Formula no. 10)

Other commonly used names for methoxy polyethylene glycol acrylate (formula no. 3) are, for example, poly (ethylene glycol) methyl ether acrylate, acryloyl-PEG, methoxy-PEG acrylate, methoxy poly(ethylene glycol) monoacrylate, poly(ethylene glycol) monomethyl ether monoacrylate or mPEG acrylate.

Particularly preferred are termonomers chosen from the below depicted formulae:

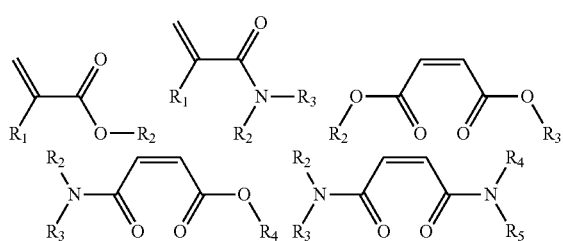

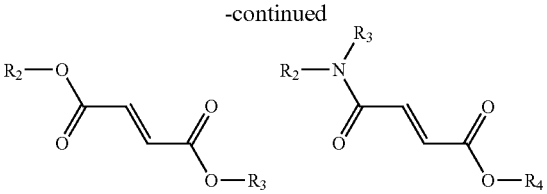

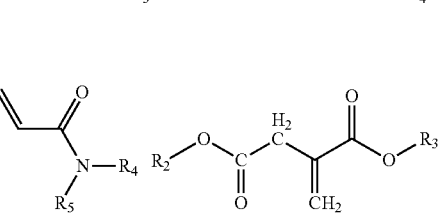

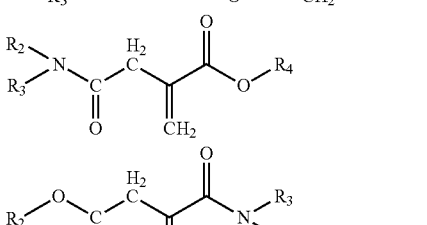

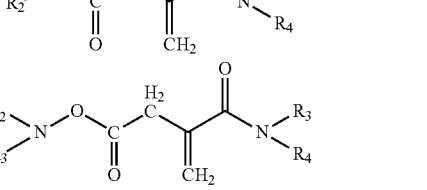

where
R$^1$ is hydrogen or methyl group, and
R$^2$, R$^3$, R$^4$, R$^5$ are identical or different and may represent H, C$_1$-C$_{12}$ alkyl, cycloalkyl, alkoxyalkyl, hydroxyalkyl, expoxyalkyl, aryl, heteroaryl.

Particularly preferred as PEG acrylate termonomer is methoxy-PEG-1-acrylate (MEA), butyldiglycol methacrylate (butoxy-PEG-2-MA; BDGMA) or ethyltiglycol methacrylate (ethoxy-PEG-3-MA).

Composition of co- and Terpolymers to be Subjected to the Present Process

In case that the NBR-latex to be subjected to the present hydrogenation process comprises repeating units of one or more further copolymerizable monomers, the proportions of conjugated diene(s) and the other copolymerizable monomers may vary within wide ranges:

The proportion of or of the sum of the conjugated dienes is usually in the range from 40 to 90 wt.-%, preferably in the range from 50 to 85 wt.-%, based on the total NBR-latex solid content. The proportion of or of the sum of the α,β-ethylenically unsaturated nitriles is usually from 10 to 60 wt.-%, preferably from 15 to 50 wt.-%, based the total NBR-latex solid content. The proportions of the monomers in each case add up to 100 wt.-%. Additional termonomers may or may not be present. If used, they are typically present in amounts of from greater than 0 to 50 wt.-%, preferably from 0.1 to 40 wt.-%, particularly preferably from 1 to 30 wt.-%, based on the the total NBR-latex solid content. In this case, corresponding proportions of the conjugated diene(s) and/or of the α,β-ethylenically unsaturated nitrile(s) are replaced by the proportions of the additional termonomers, with the proportions of all monomers in each case adding up to 100 wt.-%.

The preparation of NBR-latex by polymerization of the above mentioned monomers is adequately known to those skilled in the art and is comprehensively described in the polymer literature.

The nitrile rubbers used pursuant to this invention have a Mooney viscosity (ML 1+4 at 100° C.) in the range from 20 to 70, preferably from 30 to 50. This corresponds to a weight average molecular weight Mw in the range 100.000-500.000, preferably in the range 200.000-400.000.

A nitrile rubber having a Mooney viscosity of about 34 e.g. has an intrinsic viscosity, determined in chlorobenzene at 35° C., of about 1.1 dL/g. The nitrile rubbers used also have a polydispersity PDI=Mw/Mn, where Mw is the weight average molecular weight and Mn is the number average molecular weight, in the range of from 2.0 to 10.0 and preferably in the range 2.0 to 4.0. The determination of the Mooney viscosity is carried out in accordance with ASTM standard D 1646.

The NBR-latex useful in the present invention may be prepared by any method known to those skilled in the art, such as emulsion polymerization, solution polymerization or bulk polymerization. Preferably, NBR-latex is prepared in an aqueous emulsion polymerization process as this process directly yields the latex form of the polymer.

Preferably, according to the present invention, the polymer solid content in the aqueous emulsion lies in the range of from 1 to 75 wt.-%, more preferably from 5 to 45 wt.-% based on the total weight of the aqueous emulsion.

The preparation of such polymers which are subjected to the process pursuant to this invention is known to the skilled person and can in principle be carried out by polymerization in aqueous emulsion.

The polymer suspensions prepared in this way generally have solid contents of up to 75 wt.-%. For use in the hydrogenation process of the invention, it is possible to employ the suspensions with these solid contents. In some cases, however, it is advisable to dilute the suspensions to an appropriate solid content beforehand. The solid content of the suspensions employed is preferably in the range from 5 to 50 wt.-%, based on the overall weight of suspension.

The parent NBR-latex to be hydrogenated typically comprises 0.5 to 5 wt.-% emulsifier, before the at least one hydrogenation catalyst (a) and at least one emulsifier (b) are added prior to the hydrogenation reaction. The emulsifier in the parent NBR-latex can be of different nature such as salts of fatty acid, salts of alkyl sulfates or thelike.

The emulsifier still present, in general, in the polymer suspensions, and further substances used, for example, as customary polymerization auxiliaries in emulsion polymerizations, do not have a significant effect on the hydrogenation process of the invention.

However, it is advisable to subject the polymer suspensions to chemical or physical degassing before hydrogenation. Physical deodorization, by stripping the residual monomers with steam, is known, for example, from EP-A-0 584 458. EP-A-0 327 006 for its part recommends the use of conventional distillation methods. Chemical deodorization takes place preferably by means of a post polymerization following the main polymerization. Such processes are described, for example, in DE-A 383 4734, EP-A 379 892, EP-A 327 006, DE-A 44 19 518, DE-A 44 35 422 and DE-A 44 35 423.

For the hydrogenation process of the invention it is preferred to employ polymers prepared by free-radical aqueous emulsion polymerization of the above mentioned monomers (a) and (b) and optionally (c). These techniques are sufficiently well known to the skilled person and are described at length in the literature, for example in Ullmann's Encyclopedia of Industrial Chemistry, 5th Edition, Volume A 21, pp 373-393. In general, such polymers are prepared in the presence of free-radical initiators and, if desired, surface-active substances such as emulsifiers and protective colloids (see for example Houben Weyl, Methoden der organischen Chemie, Volumen XIV/1, Makromolekulare Stoffe, Georg Thieme Verlag, Stuttgart, 1961, pp 192-208).

Suitable free-radical polymerization initiators include organic peroxides, such as tert-butyl hydroperoxide, benzoyl hydroperoxide, diisopropylbenzoyl peroxide, inorganic peroxides, such as hydrogen peroxide, salts of peroxomono and/or peroxodisulfuric acid, especially the ammonium and/or alkali metal peroxodisulfates (persulfates), and azo compounds, particular preference being given to the persulfates. Preference is also given to combined systems composed of at least one organic reducing agent and at least one peroxide and/or hydroperoxide, such as tert-butyl hydroperoxide and the sodium salt of hydroxymethanesulfonic acid, or hydrogen peroxide and ascorbic acid (as an electrolyte-free redox initiator system) and to combine systems which additionally comprise a small amount of a metal compound which is soluble in the polymerization medium and whose metallic component can exist in a plurality of valence states, for example ascorbic acid/iron(II) sulfate/hydrogen peroxide, it also being possible frequently to replace the ascorbic acid by x the sodium salt of hydroxymethanesulfinic acid, sodium sulfite, sodium hydrogensulfite or sodium bisulfite and the hydrogen peroxide by tert-butyl hydroperoxid, alkali metal peroxodisulfates and/or ammonium peroxodisulfate. Instead of a water-soluble iron(II) salt it is also possible to employ a combination of water-soluble FeN salts.

These polymerization initiators are employed in customary amounts, such as in amounts of from 0.01 to 5, preferably from 0.1 to 2.0 wt.-%, based on the monomers to be polymerized.

The monomer mixtures can, if desired, be polymerized in the presence of customary regulators (=chain transfer agents), such as mercaptans, an example of which is tert.-dodecyl mercaptan. These regulators are then used in an amount of from 0.01 to 5 wt.-%, based on the overall amount of the mixture.

The free-radical polymerization reaction can be carried out by the whole-batch initial charge (batch) technique, but is preferably operated, especially on the industrial scale, in accordance with the feed technique. In this latter technique the major amount (generally from 50 to 100 wt.-% (=% by weight)) of the monomers to be polymerized are added to the polymerization vessel in accordance with the progress of the polymerization of the monomers already in the polymerization vessel. In this context; the free-radical initiator system can be either included entirely in the initial charge to the polymerization vessel or else added continuously or in stages to the polymerization reaction at the rate at which it is consumed in the course of the free-radical aqueous emulsion polymerization.

In each individual case this will depend, as is known, both on the chemical nature of the initiator system and on the polymerization temperature. The initiator system is preferably supplied to the polymerization zone at the rate at which it is consumed.

The polymerization reaction may also be conducted in the presence of an aqueous polymer suspension as polymer (seed latex). Such techniques are fundamentally known to the skilled worker and are described for example, in DE-A 42 13 967, DE-A 42 13 968, EP-A-0 567 811, EP-A-0 567 812 or EP-A-0 567 819, which are incorporated fully herein by reference. In principle it is possible depending on the desired character, to include the seed in the initial charge or to add it continuously or in stages in the course of polymerization. The polymerization is preferably carried out with the seed in the initial charge. The amount of seed polymer is preferably in the range from 0.05 to 5 wt.-%, preferably from 0.1 to 2 wt.-% and, in particular, from 0.2 to 1 wt.-%, based on the monomers a) to d). The polymer particles of the seed latex that is used preferably have weight-average diameters in the range from 10 to 100 nm, preferably from 20 to 60 nm and in particular, about 30 nm. Preference is given to the use of a polystyrene seed.

The polymerization reaction is carried out above atmospheric pressure. The polymerization time can vary within a wide range, and is generally from 1 to 15 hours, preferably from 3 to 10 hours. The temperature of polymerization is also variable a wide range and, depending on the initiator used, is from about 0 to 110° C., preferably 5 to 80° C.

Hydrogenation Catalyst (a)

There are no particular restrictions on the at least one hydrogenation catalyst (a) employed in the process of the present invention. The at least one hydrogenation catalyst (a) according to the process of this invention can be of any kind known to the person skilled in the art.

In a preferred embodiment of the invention, the process according to the present invention is conducted in the presence of at least one nobel metal complex hydrogenation catalyst (a).

In another embodiment of the invention, the process according to the present invention is conducted in the presence of at least one ruthenium complex hydrogenation catalyst (a).

In one embodiment of the invention, the process according to the present invention is conducted in the presence of at least one hydrogenation catalyst (a) of the general formula (A)

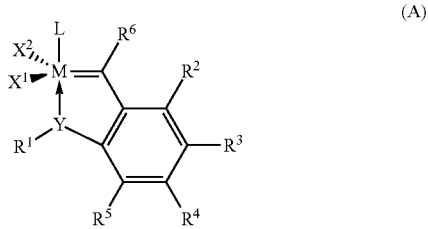

(A)

wherein
M is ruthenium or osmium,
Y is oxygen (O), sulphur (S),
$X^1$ and $X^2$ are identical or different ligands,
$R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl, $CR^{13}C(O)R^{14}$ or alkylsulphinyl radical, each of which may or may not be substituted by one or more alkyl, halogen, alkoxy, aryl or heteroaryl radicals,
$R^2$, $R^3$, $R^4$ and $R^5$ are identical or different and are each hydrogen, organic or inorganic radicals,
$R^6$ is hydrogen or an alkyl, alkenyl, alkynyl or aryl radical,
$R^{13}$ is hydrogen or alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may or may not be substituted by one or more alkyl, halogen, alkoxy, aryl or heteroaryl radicals;
$R^{14}$ is alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may or amy not be substituted by one or more alkyl, halogen, alkoxy, aryl or heteroaryl radicals; and
L is a ligand.

$X^1$ and $X^2$:

In the hydrogenation catalyst (a) of the general formula (A), $X^1$ and $X^2$ are identical or different and represent anionic ligands.

In one embodiment of the hydrogenation catalyst (a) of general formula (A), $X^1$ and $X^2$ represent hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_{20}$-alkylthiol, $C_6$-$C_{24}$-arylthiol, $C_1$-$C_{20}$-alkylsulfonyl or $C_1$-$C_{20}$-alkylsulfinyl.

The abovementioned moieties listed as meanings for $X^1$ and $X^2$ can also be substituted by one or more further substituents, for example by halogen, preferably fluorine, $C_1$-$C_{10}$-alkyl, $C_1$-$C_{10}$-alkoxy or $C_6$-$C_{24}$-aryl, where these groups, too, may in turn also be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$alkylthiol, $C_6$-$C_{14}$-arylthiol, $C_6$-$C_{14}$-aryl or $C_1$-$C_5$-alkylsulfonate.

In a particularly preferred embodiment, $X^1$ and $X^2$ represent chlorine, $CF_3COO$, $CH_3COO$, $CFH_2COO$, $(CH_3)_3CO$, $(CF_3)_2(CH_3)CO$, $(CF_3)(CH_3)_2CO$, phenoxy, methoxy, ethoxy, tosylate (p-$CH_3$—$C_6H_4$—$SO_3$), mesylate ($CH_3SO_3$) or trifluoromethanesulfonate ($CF_3SO_3$).

Ligand L:

In the hydrogenation catalyst (a) of the general formula (A), L is a ligand, usually a ligand having an electron donor function. L can be a $P(R^7)_3$ radical, where the radicals $R^7$ are each, independently of one another, $C_1$-$C_{10}$-alkyl, $C_3$-$C_8$-cycloalkyl or aryl or a substituted or unsubstituted imidazolidine radical ("Im").

$C_1$-$C_6$-Alkyl is, for example, methyl, ethyl, n-propyl, isopropyl, n-butyl, sec-butyl, tert-butyl, n pentyl, 1-methylbutyl, 2-methylbutyl, 3-methylbutyl, neopentyl, 1-ethylpropyl or n-hexyl.

$C_3$-$C_8$-Cycloalkyl encompasses cyclopropyl, cyclobutyl, cyclopentyl, cyclohexyl, cycloheptyl and cyclooctyl.

Aryl encompasses an aromatic radical having from 6 to 24 skeletal carbon atoms. Preferred monocyclic, bicyclic or tricyclic carbocyclic aromatic radicals having from 6 to 10 skeletal carbon atoms are, for example, phenyl, biphenyl, naphthyl, phenanthrenyl and anthracenyl.

The imidazolidine radical (Im) usually has a structure of the general formula (IIa) or (IIb),

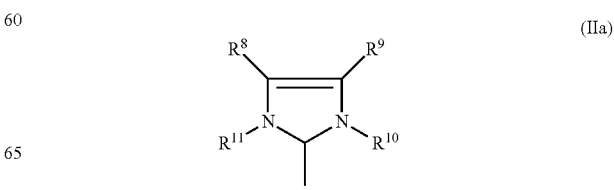

(IIa)

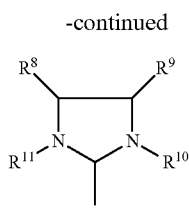 (IIb)

where

R⁸, R⁹, R¹⁰, R¹¹ are identical or different and are each hydrogen, straight-chain or branched $C_1$-$C_{30}$-alkyl, preferably $C_1$-$C_{20}$-alkyl, $C_3$-$C_{20}$-cycloalkyl, preferably $C_3$-$C_{10}$-cycloalkyl, $C_2$-$C_{20}$-alkenyl, preferably $C_2$-$C_{10}$-alkenyl, $C_2$-$C_{20}$-alkynyl, preferably $C_2$-$C_{10}$-alkynyl, $C_2$-$C_6$-$C_{24}$-aryl, preferably $C_6$-$C_{14}$-aryl, $C_1$-$C_{20}$-carboxylate, preferably $C_1$-$C_{10}$-carboxylate, $C_1$-$C_{20}$-alkoxy, preferably $C_1$-$C_{10}$-alkoxy, $C_2$-$C_{20}$-alkenyloxy, preferably $C_2$-$C_{10}$-alkenyloxy, $C_2$-$C_{20}$-alkynyloxy, preferably $C_2$-$C_{10}$-alkynyloxy, $C_6$-$C_{20}$-aryloxy, preferably $C_6$-$C_{14}$-aryloxy, $C_2$-$C_{20}$-alkoxycarbonyl, preferably $C_2$-$C_{10}$-alkoxycarbonyl, $C_1$-$C_{20}$-alkylthio, preferably $C_1$-$C_{10}$-alkylthio, $C_6$-$C_{20}$-arylthio, preferably $C_6$-$C_{14}$-arylthio, $C_1$-$C_{20}$-alkylsulphonyl, preferably $C_1$-$C_{10}$-alkylsulphonyl, $C_1$-$C_{20}$-alkylsulphonate, preferably $C_1$-$C_{10}$-alkylsulphonate, $C_6$-$C_{20}$-arylsulphonate, preferably $C_6$-$C_{14}$-arylsulphonate, or $C_1$-$C_{20}$-alkylsulphinyl, preferably $C_1$-$C_{10}$-alkylsulphinyl.

One or more of the radicals $R^8$, $R^9$, $R^{10}$, $R^{11}$ may or may not, independently of one another, be substituted by one or more substituents, preferably straight-chain or branched $C_1$-$C_{10}$-alkyl, $C_3$-$C_8$-cycloalkyl $C_1$-$C_{10}$-alkoxy or $C_6$-$C_{24}$-aryl, where these abovementioned substituents may in turn be substituted by one or more radicals, preferably selected from the group consisting of halogen, in particular chlorine or bromine, $C_1$-$C_5$-alkyl, $C_1$-$C_5$-alkoxy and phenyl.

In a preferred embodiment of the hydrogenation catalyst (a) of the general formula (A), $R^8$ and $R^9$ are each, independently of one another, hydrogen, $C_6$-$C_{24}$-aryl, particularly preferably phenyl, straight-chain or branched $C_1$-$C_{10}$-alkyl, particularly preferably propyl or butyl, or together form, with inclusion of the carbon atoms to which they are bound, a cycloalkyl or aryl radical, where all the abovementioned radicals may in turn be substituted by one or more further radicals selected from the group consisting of straight-chain or branched $C_1$-$C_{10}$-alkyl, $C_1$-$C_{10}$-alkoxy, $C_6$-$C_{24}$-aryl and functional groups selected from the group consisting of hydroxy, thiol, thioether, ketone, aldehyde, ester, ether, amine, imine, amide, nitro, carboxyl, disulphide, carbonate, isocyanate, carbodiimide, carboalkoxy, carbamate and halogen.

In a preferred embodiment of the hydrogenation catalyst (a), the radicals $R^{10}$ and $R^{11}$ are identical or different and are each straight-chain or branched $C_1$-$C_{10}$-alkyl, particularly preferably i-propyl or neopentyl, $C_3$-$C_{10}$-cycloalkyl, preferably adamantyl, $C_6$-$C_{24}$-aryl, particularly preferably phenyl, $C_1$-$C_{10}$-alkylsulphonate, particularly preferably methanesulphonate, $C_6$-$C_{10}$-arylsulphonate, particularly preferably p-toluenesulphonate.

These radicals $R^{19}$ and $R^{11}$ which are mentioned above as being preferred may or may not be substituted by one or more further radicals selected from the group consisting of straight-chain or branched $C_1$-$C_5$-alkyl, in particular methyl, $C_1$-$C_5$-alkoxy, aryl and functional groups selected from the group consisting of hydroxy, thiol, thioether, ketone, aldehyde, ester, ether, amine, imine, amide, nitro, carboxyl, disulphide, carbonate, isocyanate, carbodiimide, carboalkoxy, carbamate and halogen.

In particular, the radicals $R^{10}$ and $R^{11}$ are identical or different and are each i-propyl, neopentyl, adamantyl or mesityl.

Particularly preferred imidazolidine radicals (Im) have the structures (IIIa-f), where Mes is in each caes a 2,4,6-trimethylphenyl radical

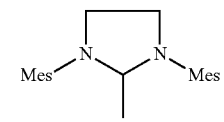 (IIIa)

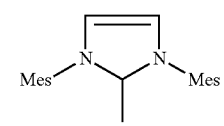 (IIIb)

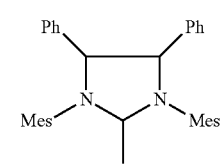 (IIIc)

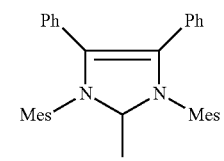 (IIId)

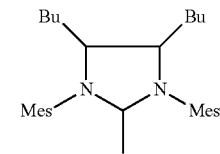 (IIIe)

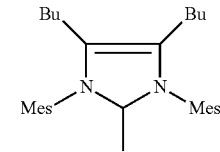 (IIIf)

$R^1$:

In the general formula (A), the substituent $R^1$ is an alkyl, preferably isopropyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may or may not in each case be substituted by one or more alkyl, halogen, alkoxy, aryl or heteroaryl radicals.

The substituent $R^1$ is usually a $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_6$-$C_{24}$-arylthio, $C_1$-$C_{20}$-alkylsulphonyl or $C_1$-$C_{20}$-alkylsulphinyl radical which may or amy not in each case be substituted by one or more alkyl, halogen, alkoxy, aryl or heteroaryl radicals.

$R^1$ is preferably a $C_3$-$C_{20}$-cylcoalkyl radical, a $C_6$-$C_{24}$-aryl radical or a straight-chain or branched $C_1$-$C_{30}$-alkyl radical, with the latter being able, if appropriate, to be interrupted by one or more double or triple bonds or one or more heteroatoms, preferably oxygen or nitrogen. $R^1$ is particularly preferably a straight-chain or branched $C_1$-$C_{12}$-alkyl radical.

$C_3$-$C_{20}$-Cycloalkyl radicals encompass, for example, cyclopropyl, cyclobutyl, cyclopentyl, cyclohexyl, cycloheptyl and cyclooctyl.

A $C_1$-$C_{12}$-alkyl radical can be, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, n-heptyl, n-octyl, n-decyl or n-dodecyl. In particular, $R^1$ is methyl or isopropyl.

A $C_6$-$C_{24}$-aryl radical is an aromatic radical having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

$R^2$, $R^3$, $R^4$ and $R^5$:

In the general formula (A), the radicals $R^2$, $R^3$, $R^4$ and $R^5$ are identical or different and can each be hydrogen or an organic or inorganic radical.

In an appropriate embodiment, $R^2$, $R^3$, $R^4$, $R^5$ are identical or different and are each hydrogen, halogen, nitro, $CF_3$, alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl, $CR^{13}C(O)R^{14}$ or alkylsulphinyl which may or may not be in each case substituted by one or more alkyl, alkoxy, halogen, aryl or heteroaryl radicals.

$R^2$, $R^3$, $R^4$, $R^5$ are usually identical or different and are each hydrogen, halogen, preferably chlorine or bromine, nitro, $CF_3$, $C_3$-$C_{20}$-cylcoalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl which may or may not be in each case substituted by one or more $C_1$-$C_{30}$-alkyl, $C_1$-$C_{20}$-alkoxy, halogen, $C_6$-$C_{24}$-aryl or heteroaryl radicals.

In a particularly useful embodiment, $R^2$, $R^3$, $R^4$, $R^5$ are identical or different and are each nitro, straight-chain or branched $C_1$-$C_{30}$-alkyl, $C_5$-$C_{20}$-cylcoalkyl, straight-chain or branched $C_1$-$C_{20}$-alkoxy or $C_6$-$C_{24}$-aryl radicals, preferably phenyl or naphthyl. The $C_1$-$C_{30}$-alkyl radicals and $C_1$-$C_{20}$-alkoxy radicals may or may not be interrupted by one or more double or triple bonds or one or more heteroatoms, preferably oxygen or nitrogen.

Furthermore, two or more of the radicals $R^2$, $R^3$, $R^4$ or $R^5$ can also be bridged via aliphatic or aromatic structures. For example, $R^3$ and $R^4$ together with the carbon atoms to which they are bound in the phenyl ring of the formula (A) can form a fused-on phenyl ring so that, overall, a naphthyl structure results.

$R^6$:

In the general formula (A), the radical $R^6$ is hydrogen or an alkyl, alkenyl, alkynyl or aryl radical. $R^6$ is preferably hydrogen, a $C_1$-$C_{30}$-alkyl radical, a $C_2$-$C_{20}$-alkenyl radical, a $C_2$-$C_{20}$-alkynyl radical or a $C_6$-$C_{24}$-aryl radical. $R^6$ is particularly preferably hydrogen.

$R^{13}$ and $R^{14}$:

In the general formula (A), the radical $R^{13}$ is hydrogen or alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may or may not be substituted by one or more alkyl, halogen, alkoxy, aryl or heteroaryl radicals.

In the general formula (A), the radical $R^{14}$ is alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may or amy not be substituted by one or more alkyl, halogen, alkoxy, aryl or heteroaryl radicals; and Particular preference is given to hydrogenation catalysts (a) of the general formula (A) in which
M is ruthenium,
Y is oxygen,
$X^1$ and $X^2$ are both halogen, in particular, both chlorine,
$R^1$ is a straight-chain or branched $C_1$-$C_{12}$-alkyl radical,
$R^2$, $R^3$, $R^4$, $R^5$ have the meanings given for the general formula (A) and
L has the meanings given for the general formula (A).

Very particular preference is given to hydrogenation catalysts (a) of the general formula (A) in which
M is ruthenium,
Y is oxygen,
$X^1$ and $X^2$ are both chlorine,
$R^1$ is an isopropyl radical,
$R^2$, $R^3$, $R^4$, $R^5$ are all hydrogen and
L is a substituted or unsubstituted imidazolidine radical of the formula (IIa) or (IIb),

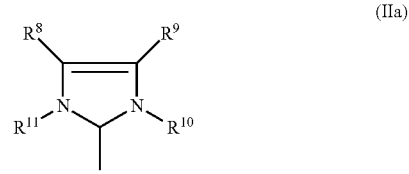

(IIa)

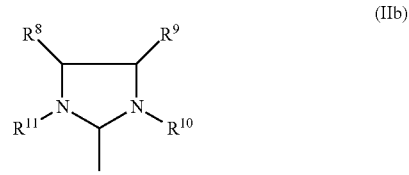

(IIb)

where
$C^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{24}$-arylsulphonate or $C_1$-$C_{20}$-alkylsulphinyl.

Preference is given to a catalyst (a) of the general formula (A) is used wherein
M is Ruthenium,
Y is oxygen,
$X^1$ and $X^2$ represent chlorine, $CF_3COO$, $CH_3COO$, $CFH_2COO$, $(CH_3)_3CO$, $(CF_3)_2(CH_3)CO$, $(CF_3)(CH_3)_2CO$, phenoxy, methoxy, ethoxy, tosylate (p-$CH_3$—$C_6H_4$—$SO_3$), mesylate ($CH_3SO_3$) or trifluoromethanesulfonate ($CF_3SO_3$),
$R^1$ is $C_3$-$C_{20}$-cylcoalkyl, $C_6$-$C_{24}$-aryl or a straight-chain or branched $C_1$-$C_{30}$-alkyl radical, with the latter being or being not interrupted by one or more double or triple bonds or one or more heteroatoms, preferably oxygen or nitrogen, and
$R^2$, $R^3$, $R^4$, $R^5$ are identical or different and are each hydrogen, halogen, preferably chlorine or bromine, nitro, $CF_3$, $C_1$-$C_{30}$-alkyl, $C_3$-$C_{20}$-cylcoalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl which may or may not in each case be substituted by one or more $C_1$-$C_{30}$-alkyl, $C_1$-$C_{20}$-alkoxy, halogen, $C_6$-$C_{24}$-aryl or heteroaryl radicals.

These hydrogenation catalysts (a) are known in principle, for example from US 2002/0107138 A1 (Hoveyda et al.), and can be obtained by preparative methods indicated there. The catalysts are commercially available or can be prepared as described in the scientific literature.

Particular preference is given to the hydrogenation catalyst (a) having the structure (A1) (Hoveyda-Grubbs $2^{nd}$ generation catalyst; HG2) which are commercially available at Materia Inc

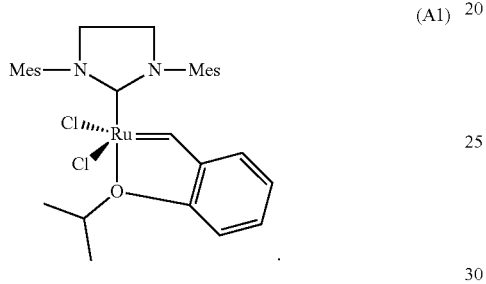

(A1)

Further suitable hydrogenation catalysts (a) which come under the general formula (A) are those of the formulae (A2), (A3), (A4), (A5), (A6), (A7), (A8) and (A9), where Mes is in each case a 2,4,6-trimethylphenyl radical.

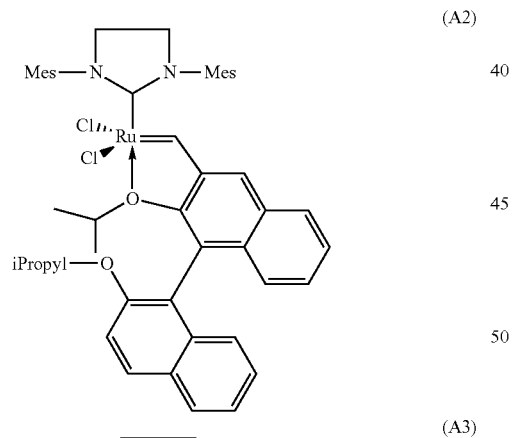

(A2)

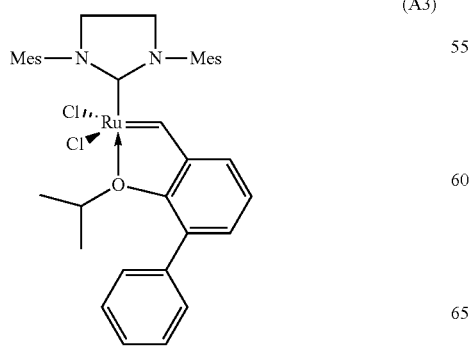

(A3)

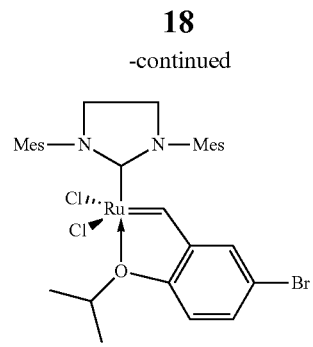

(A4)

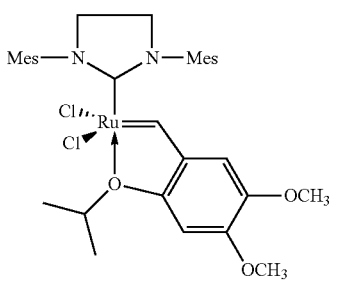

(A5)

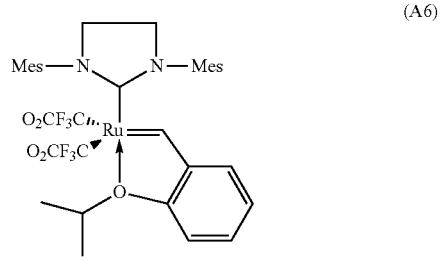

(A6)

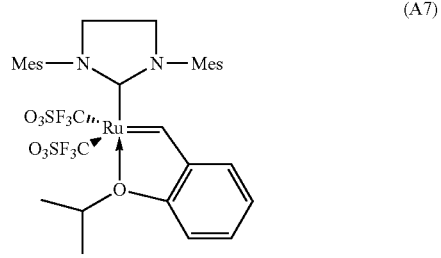

(A7)

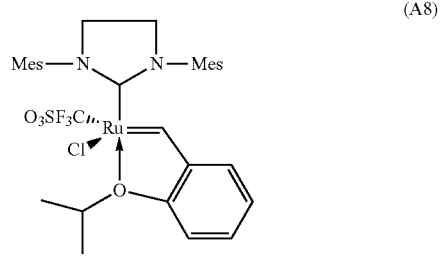

(A8)

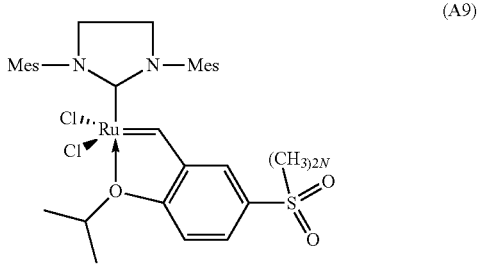

(A9)

Further hydrogenation catalysts (a) which are particularly suitable for the process according to the invention are catalysts of the general formula (B)

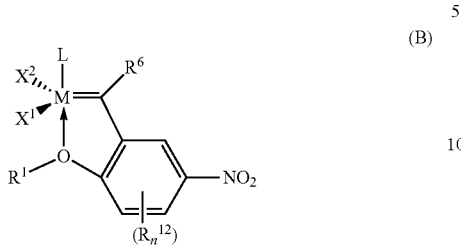

(B)

where
M, L, $X^1$, $X^2$, $R^1$ and $R^6$ have the meanings given for the general formula (A),
the radicals $R^{12}$ are identical or different and have the meanings given for the radicals $R^2$, $R^3$, $R^4$ and $R^5$ for the general formula (A), and
n is 0, 1, 2 or 3.

These hydrogenation catalysts (a) are known in principle, for example from WO-A-2004/035596 (Grela), and can be obtained by the preparative methods indicated there.

Particular preference is given to hydrogenation catalysts (a) of the general formula (B) in which
M is ruthenium,
$X^1$ and $X^2$ are both halogen, in particular both chlorine,
$R^1$ is a straight-chain or branched $C_1$-$C_{12}$-alkyl radical,
$R^{12}$ has the meanings given for the general formula (A),
n is 0, 1, 2 or 3 and
L has the meanings given for the general formula (A).

Very particular preference is given to hydrogenation catalysts (a) of the general formula (B) in which
M is ruthenium,
$X^1$ and $X^2$ are both chlorine,
$R^1$ is an isopropyl radical,
n is 0 and
L is a substituted or unsubstituted imidazolidine radical of the formula (IIa) or (IIIb),

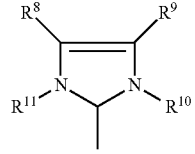

(IIa)

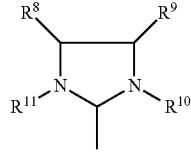

(IIb)

where
$R^8$, $R^9$, $R^{10}$, $R^{11}$ are identical or different and are each hydrogen, straight-chain or branched, cyclic or acyclic $C_1$-$C_{39}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_4$-arylthio, $C_1$-$C_{20}$-alkylsulphonyl, $C_1$-$C_{20}$-alkylsulphonate, $C_6$-$C_4$-arylsulphonate or $C_1$-$C_{20}$-alkylsulphinyl.

A particularly suitable hydrogenation catalyst (a) which comes under the general formula (B) has the structure (B1)

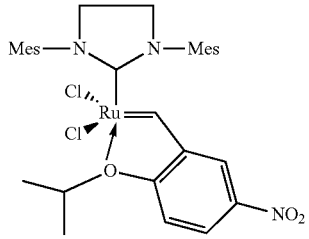

(B1)

and is also referred to in the literature as the "Grela catalyst".

A further suitable hydrogenation catalyst (a) which comes under the general formula (B) has the structure (B2)

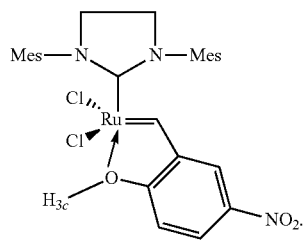

(B2)

Further hydrogenation catalysts (a) which are particularly suitable for the process according to the invention are catalysts of the general formula (C)

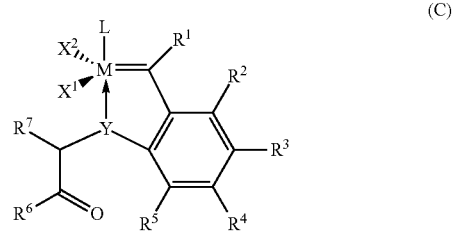

(C)

where
M is ruthenium or osmium,
Y is oxygen (O), sulphur (S),
$X^1$ and $X^2$ are identical or different ligands, preferably with meanings given for general formula (A)
$R^1$ is hydrogen or an alkyl, alkenyl, alkynyl or aryl radical
$R^2$, $R^3$, $R^4$, $R^5$ are identical or different and are each hydrogen, organic or inorganic radicals,
$R^6$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals, R[7] is hydrogen or an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals, and L is a ligand, preferably with the meanings given for general formula (A).

The catalysts of the general formula (C) are known in principle. Representatives of this class of compounds are the catalysts described by Arlt et al. in WO-A1-2008/034552. The catalysts are commercially available or can be prepared as described in the references cited.

A preferred hydrogenation catalyst (a) which comes under the general formula (C) has the structure (C1)

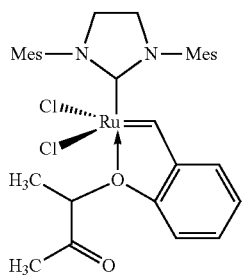

(C1)

which is also referred to herein as "Arlt catalyst".

Further hydrogenation catalysts (a) which are particularly suitable for the process according to the invention are catalysts of the general formula (D),

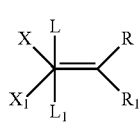

(D)

wherein

M is ruthenium or osmium,

R and R[1] are, independently, hydrogen or a hydrocarbon selected from the group consisting of $C_2$-$C_{20}$ alkenyl, $C_2$-$C_{20}$ alkynyl, $C_1$-$C_{20}$ alkyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl and $C_1$-$C_{20}$ alkylsulfinyl, X and X[1] are independently any anionic ligand, preferably with the meanings given for general formula (A), L is any neutral ligand, such as phosphines, amines, thioethers, L[1] is an imidazolidinylidene or imidazolidine or any neutral carbine, optionally, L and L[1] can be linked to one another to from a bidentate neutral ligand, preferably with the meanings given for general formula (A).

These catalysts which are known in the technical field as "Grubbs (II) catalysts", are known in principle, for example from WO-A-00/71554, and can be obtained by the preparative methods indicated there.

A preferred hydrogenation catalyst (a) which comes under the general formula (D) has the structure (D1)

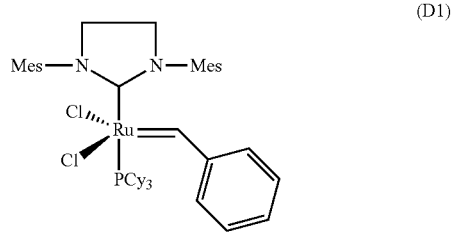

(D1)

(1,3-bis-(2,4,6-trimethylphenyl)-2-imidazolidinylidene)-(tricyclohexylphosphine)ruthenium(phenylmethylene) dichloride) known as 2nd generation Grubb's catalyst. or Grubbs II catalyst.

Further hydrogenation catalysts (a) which are particularly suitable for the process according to the invention are catalysts of the general formula (E), (F) or (G),

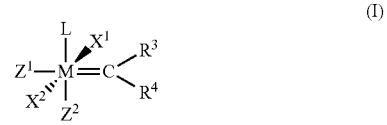

(I)

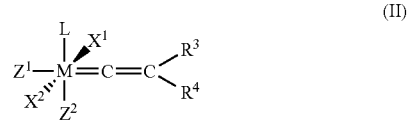

(II)

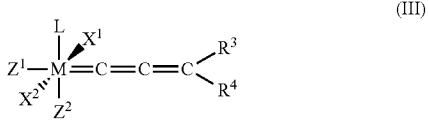

(III)

where

M is ruthenium or osmium,

X[1] and X[2] are identical or different ligands, preferably anionic ligands,

Z[1] and Z[2] are identical or different and neutral electron donor ligands,

R[3] and R[4] are each independently hydrogen or a substituent selected from the group consisting of alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl and alkylsulphinyl radical, each of which may optionally be substituted by one or more alkyl, halogen, alkoxy, aryl or heteroaryl radicals, and L is a ligand.

These hydrogenation catalysts (a) are known in principle, for example from WO-A-2011/023788, and can be obtained by the preparative methods indicated there.

A preferred hydrogenation catalyst (a) which comes under the general formula (E) has the structure (E1).

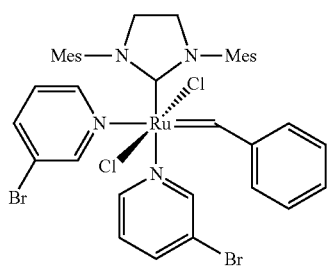

(E1)

Particularly preferred hydrogenation catalysts (a) are those of the formula (A1), (B1), (C1), (D1) or (E1) and most preferred is (A1).

The hydrogenation catalyst (a) is employed in an amount from 0.005 to 5.0 wt.-%, preferably from 0.02 to 2.0 wt.-%, more preferably from 0.05 to 0.3 wt.-% based on the weight of the nitrile butadiene rubber solid content of the latex.

Emulsifier (b):

There are no particular restrictions on the emulsifiers (b) that can be used.

A suitable emulsifier is an alkali metal salt or ammonium salt of fatty acids ($C_{12}$-$C_{23}$-alkyl radicals), preferably sodium oleate (NaO) or potassium oleate (KO).

Further suitable emulsifiers are emulsifiers, such as the alkali metal salts or ammonium salts of alkyl sulfates (alkyl: $C_8$ to $C_{22}$), of sulfuric monoesters of ethoxylated alkanols (ethyleneoxide degree: 4 to 30, alkyl: $C_8$ to $C_{22}$) and of ethoxylated alkylphenols (ethyleneoxide degree: 3 to 50, alkyl: $C_4$ to $C_{20}$), of alkylsulfonic acids (alkyl: $C_8$ to $C_{22}$) and of alkylarylsulfonic acids (alkyl: $C_4$ to $C_{18}$). Preferred emulsifiers are sodium dodecyl sulfate (SDS) and sodium dodecyl benzene sulfonate (SDBS).

Further suitable emulsifiers are ethoxylated mono, di- and trialkylphenols (ethyleneoxide degree: 3 to 50; Alkyl $C_4$ to $C_9$) or ethoxylated fatty alcohols (ethyleneoxide degree: 3 to 50; alkyl $C_4$ to $C_9$).

Further suitable emulsifiers are alkali metal salts or ammonium salts of mono- or di-$C_4$-$C_{24}$ alkyl derivatives of bis(phenylsulfonic acid)ether.

Further suitable emulsifieres are alkali metal salts or ammonium salts, especially the sodium salts, of alkylarylsulfonic acids, alkylsulfonic acids (eg. sulfonated $C_{12}$-$C_{18}$ paraffin), alkylsulfates (eg. sodium lauryl sulfonate) and of the sulphuric monoesters of ethoxylated alkanols (eg. sulfoxylated ethoxylate of lauryl alcohol with 2 to 3 ethyleneoxide units).

Additional appropriate emulsifiers are given in Houben-Weyl, loc. Cit., pp. 192-208.

Particularly preferred emulsifiers (b) are sodium oleate (NaO), potassium oleate (KO), sodium dodecyl sulfate (SDS) and sodium dodecyl benzene sulfonate (SDBS).

The most preferred emulsifier is potassium oleate (KO).

Typically, the amount of the at least one added emulsifiers (b), based on the monomers to be polymerized, is in the range from 0.1 to 50.0 wt.-%, preferably 0.5 to 15.0 wt. %, more preferably 1.0 to 10.0 wt.-% and most preferably 5.0 to 10.0 wt.-%, based on the weight of the nitrile butadiene rubber solid content of the latex.

If the amount of added emulsifier is too low, the hydrogenation rate is slow and the hydrogenation degree will not reach 95% or more within a satisfying time.

Hydrogenation Process Parameters:

The step of hydrogenation is typically carried out at a temperature in the range of from 60° C. to 200° C., preferably from 80° C. to 180° C., more preferably from 90° C. to 160° C. and at a hydrogen pressure in the range of 0.5 MPa to 35 MPa, preferably of 3.0 MPa to 15 MPa and more preferably of 5.0 MPa to 10 MPa.

In an alternative embodiment, the step of hydrogenation is carried out at a temperature in the range of from 60° C. to 200° C., preferably from 80° C. to 180° C., more preferably from 90° C. to 160° C.

In an alternative embodiment, the step of hydrogenation is typically carried out at a hydrogen pressure in the range of 0.5 MPa to 35 MPa, preferably of 3.0 MPa to 15 MPa and more preferably of 5.0 MPa to 10 MPa.

In the process according to the invention the at least one hydrogenation catalyst (a), preferably the nobel metal complex hydrogenation catalyst, more preferably the Ruthenium complex hydrogenation catalyst, even more preferably the catalyst of the general formula (A) and most preferably the catalyst of the formula (A1) is used in an amount in the range from 0.005 wt.-% to 5.0 wt.-%, preferably 0.02% to 2.0 wt.-%, based on the weight of the nitrile butadiene rubber solid content of the latex.

The hydrogenation catalysts (a) can be water-insoluble or water-soluble.

Thus, the process of the invention is performed either in the absence or presence of an organic solvent, preferably in the absence of any organic solvent.

In one embodiment of the inventive process, the hydrogenation catalyst (a) is water-insoluble and, thus, is dissolved in a small amount of an organic solvent forming an organic solution and then dosed into the aqueous suspension containing the nitrile butadiene rubber latex to be subjected to the process of the present invention. Suitable organic solvents to dissolve the hydrogenation catalysts (a) include, but are not limited to, dichloromethane, benzene, toluene, tetrahydrofuran, methyl ethyl ketone, and cyclohexane. The most preferred solvent is toluene. In a typical embodiment of the present invention the water of the aqueous nitrile butadiene rubber suspension and the organic solvent used to dissolve the hydrogenation catalyst (a) are used in a volume ratio of 100:1 to 5:1, preferably of 50:1 to 10:1.

Hydrogenation in this invention is understood by preferably at least 50% of the residual double bonds (RDB) present in the starting nitrile butadiene rubber latex being hydrogenated, preferably 70% to 100%, more preferably 80% to 100%, even more preferably 90% to 100% and most preferably 95% to 100%.

Preferably, the hydrogenation time of the nitrile butadiene rubber latex is from 10 minutes to 24 hours, preferably from 15 minutes to 20 hours, more preferably from 30 minutes to 10 hours, even more preferably from 1 hour to 8 hours and most preferably from 1 hour to 5 hours.

In one embodiment of the inventive process, the aqueous suspension of the nitrile butadiene rubber is contacted with the organic solution of the at least one hydrogenation catalyst (a). The concentration of the nitrile butadiene rubber in the suspension is not critical. The concentration of nitrile butadiene rubber in the reaction mixture is preferably in the range from 1 to 50 wt.-%, particularly preferably in the range from 5 to 40 wt.-%, based on weight of the total reaction mixture.

The hydrogenation catalyst (a) used in the inventive process is so active that the catalyst residue in the final hydrogenated polymer products can be low enough to make the catalyst metal removal or recycle step alleviated or even unnecessary.

However, to the extent desired, the hydrogenation catalyst (a) used during the process of the present invention may be removed. Such removal can be performed e.g. by using ion-exchange resins as described in EP-A-2 072 532 A1 and EP-A-2 072 533 A1. The reaction mixture obtained after the completion of the hydrogenation reaction can be taken and treated with an ion-exchange resin at e.g. 100° C. for 48 hours under nitrogen which leads to a bonding of the hydrogenation catalyst (a) to the resin while the reaction mixture can be worked up with the usual finishing methods.

The rubber can then be obtained from the solution by known workup procedures such as salt coagulation, acid coagulation or solvent evaporation and dried to a degree that allows usage in typical rubber processing methods.

In one embodiment of the inventive process, the hydrogenation catalyst (a) is contacted with the emulsifier (b) beforehand and then added to the parent NBR-latex to be hydrogenated.

In an alternative embodiment of the inventive process, the hydrogenation catalyst (a) and the emulsifier (b) are added directly to the nitrile butadiene rubber latex to be hydrogenated.

The present invention further comprises a stabilized hydrogenated nitrile rubber latex (HNBR-latex) obtained by the process of the invention, comprising 2 to 20 wt.-% emulsifier, preferably 5 to 18 wt.-% emulsifier and more preferably 10 to 15 wt.-% emulsifier based on the solid content of the HNBR-latex.

The hydrogenated nitrile rubber latex comprising 2 to 20 wt.-% emulsifier is stable and can be easily further processed, e.g. mixed and dipped in typical applications. If the level of emulsifier (b) is too low, the HNBR-latex is not stable. If the level of emulsifier (b) is too high, it is difficult to perform further processes with the HNBR-latex such as e.g. coagaulation and to compound the manufactured HNBR.

The present invention further comprises the use of potassium oleate emulsifier (b) as an additional emulsifier in a process for preparing hydrogenated nitrile rubber latex to increase the hydrogenation rate of the NBR-latex hydrogenation process.

One advantage of the present invention is the increased hydrogenation rate of the hydrogenation process after addition of emulsifier, such as potassium oleate, to an NBR-latex when using a hydrogenation catalyst (a).

The improvement of the hydrogenation rate is independent of the type and amount of emulsifier used during the polymerization of the parent NBR-latex.

EXAMPLES

The following examples with the experimental conditions shown below illustrate the scope of the invention and are not intended to limit the same. The materials which were used in the NBR-latex synthesis and NBR-latex hydrogenation reaction are listed in Table A.

TABLE A

Materials used for the NBR-latex synthesis and the hydrogenation

| Material | Supplier |
| --- | --- |
| Acrylonitrile (ACN); monomer | Sigma-Aldrich |
| Butadiene (BD); monomer | ARLANXEO |
| tert-Dodecylmercapten (t-DDM, 98.5% purity); chain transfer agent | Sigma-Aldrich |
| Potassium persulfate (KPS, regant grade); initiator | Sigma-Aldrich |
| Sodium metabisulfite (SMBS), initiator | Sigma-Aldrich |
| Sodium phosphate monobasic anhydrous (NaP, ≥ 99.0%) pH control agent | Sigma-Aldrich |
| Distilled water | |
| Diethylhydroxylamine (DEHA) | Sigma-Aldrich |
| Hoveyda-Grubbs catalyst, second generation (HG2) | Sigma-Aldrich |
| Potassium Oleate (KO) | Sigma-Aldrich |
| Sodium Dodecyl Benzene Sulfonate (SDBS) | Sigma-Aldrich |
| Sodium Dodecyl Sulfate (SDS) | Sigma-Aldrich |
| KO-latex commercial; NBR-latex with 34% ACN, 66% BD and 1.8 phm KO-emulsifier | ARLANXEO |

Synthesis of Emulsified NBR-Latex:

Firstly, 1.5 mL ACN was mixed with 0.2 mL t-DDM. The resulting mixture was then added into a charging tube and mixed with 22.5 mL BD. 6 mL ACN, initiator KPS and SMBS, NaP and surfactant (=SDBS, SDS or KO) were added into 200 mL distilled water in the reactor. This mixture was degassed and fully mixed. Afterwards, 2.5 mL mixture of ACN, t-DDM, and BD from the charging tube was added into the reactor at one time. The resulting mixture was allowed to mix for 30 min. Then, the mixture was heated up to the reaction temperature to start the polymerization. The rest of the mixture of ACN, t-DDM, and BD was then charged into the reactor via a semibatch mode. After the completion of addition, the reaction mixture was aged for a certain time to realize a reasonable conversion. The polymerization was terminated by decreasing the temperature to around 5° C. via an ice-water bath. After obtaining the latex, 0.03 phr DEHA was added to the final NBR-latex.

Depending on the type of employed surfactant, the final NBR-latex is named "SDS-latex", "SDBS-latex" or "KO-latex".

| | Emulsifier g/phm | KPS g/phm | ACN phm | BD phm | t-DDM mL/phm | Temp ° C. | Conv. wt % |
| --- | --- | --- | --- | --- | --- | --- | --- |
| SDS-latex | 3.0/14.6 (SDS) | 0.15/0.73* | 30 | 70 | 0.08/0.3 | 30 | 60.3 |
| SDBS-Latex | 2.0/12.5 (SDBS) | 0.6/3.7** | 38 | 62 | 0.08/0.4 | 30 | 72.4 |
| KO-latex (1) | 0.4/2 (KO) | 0.4/1.95 | 30 | 70 | 0.15/0.63 | 35 | 59.98 |
| KO-latex (2) | 0.82/4 (KO) | 0.4/1.95 | 30 | 70 | 0.15/0.63 | 35 | 63.09 |
| KO-latex (3) | 1.64/8 (KO) | 0.4/1.95 | 30 | 70 | 0.15/0.63 | 35 | 70.29 |
| KO-latex (4) | 2.04/10 (KO) | 0.4/1.95 | 30 | 70 | 0.15/0.63 | 35 | 73.21 |

-continued

| | Emulsifier g/phm | KPS g/phm | ACN phm | BD phm | t-DDM mL/phm | Temp °C. | Conv. wt % |
|---|---|---|---|---|---|---|---|
| KO-latex (5) | 1.22/6 (KO) | 0.4/1.95 | 30 | 70 | 0.15/0.63 | 35 | 72.10 |
| KO-latex (6) | 3.0/14.6 (KO) | 0.4/1.94 | 30 | 70 | 0.08/0.33 | 50 | 68.4 |

*0.05 g/0.24 phm SMBS;
**0.2 g/1.25 phm SMBS

Hydrogenation of NBR-Latex:

The hydrogenation reaction was carried out in a 300 mL Parr 316 Stainless Steel reactor. First 25 ml of NBR-latex and 75 ml water were charged into the reactor. The NBR-latex was degassed by bubbling nitrogen gas under about 1.38 MPa for 20 min at room temperature and was then heated to 100° C.

Then, the solid hydrogenation catalyst (a) and the emulsifier (b) were added into the NBR-latex with 8.5 MPa hydrogen gas at 450 rpm. The hydrogen pressure and reaction temperature were kept constant throughout the reaction period. The hydrogenated NBR-latex was sampled through a dip tube into the reactor at intervals during the reaction.

The hydrogenation results are shown in Tables 1 to 6. No visible gel was generated and the resultant hydrogenated NBR ("HNBR") polymer was tested to be easily soluble in methyl ethyl ketone.

Determination of Hydrogenation Degree:

The hydrogenation conversion was determined by FTIR recorded on a Bio-Rad FTS 3000MX spectrometer (Bio-Rad Laboratories). In a typical run, the latex aliquot with a certain degree of hydrogenation was first isolated to obtain the polymer solid. The dried polymer was then re-dissolved in methyl ethyl ketone (MEK; around 0.5 wt %) and a polymer film was cast onto a sodium chloride disc for FTIR analysis. The calculation of the degree of hydrogenation is based on the corresponding absorbance (A) of the important peaks at 2236, 970, and 723 cm$^{-1}$ from the IR spectrum. The 2236 cm$^{-1}$ peak is assigned to the cyano group (C≡N). The 970 cm$^{-1}$ peak is assigned to the C=C (1,4-trans). The 723 cm$^{-1}$ is a new peak assigned to the $(CH_2)_n$, n>4.

EXAMPLE SERIES

Example 1

Table 1 shows the results of the hydrogenation of commercial KO-emulsified NBR-latex (=KO-latex commercial). Different amounts of added emulsifier (b) (KO) were employed.

TABLE 1

Hydrogenation of KO-emulsified NBR-latex using HG2 catalyst and additional KO emulsifier (8.3 MPa hydrogen, 120° C.).

| Experiment No. | A1 | A2 | A3 | A4 | A5 |
|---|---|---|---|---|---|
| Latex type | KO-latex | KO-latex | KO-latex | KO-latex | KO-latex |
| Emulsifier in latex [phm] | 1.8 | 1.8 | 1.8 | 1.8 | 1.8 |
| (a) Hydrogenation catalyst [wt.-%] | 0.02 | 0.02 | 0.02 | 0.02 | 0.02 |
| (b) Added KO [wt.-%] | 0.0 | 2.5 | 5.0 | 7.5 | 10.0 |
| Reaction time [h] | Degree of hydrogenation [%] | | | | |
| 1 | 80.60 | 88.40 | 95.80 | 97.80 | 97.70 |
| 2 | 90.60 | 96.80 | 99.00 | 99.50 | 99.50 |
| 3 | 93.10 | 98.20 | 100.00 | 100.00 | 100.00 |
| 4 | 94.40 | 98.90 | 100.00 | 100.00 | 100.00 | wt.-% = weight percent based on the weight of the nitrile butadiene rubber solid content of the latex The experiments A1 to A5 show that the addition of KO-emulsifier increases the hydrogenation rate of the NBR-latex hydrogenation process.

Without the addition of KO-emulsifier, the degree of hydrogenation is below 95% after 4 hours of hydrogenation.

NBR-latex hydrogenation reactions with 5 to 10 wt.-% of added KO based on the weight of the nitrile butadiene rubber solid content of the latex show the highest hydrogenation rate and reach a degree of hydrogenation of 99.0% within 2 hours.

Example 2: SDBS-/SDS-Emulsified NBR-Latex+KO Added

Table 2 shows the results of the hydrogenation of SDBS- and SDS-emulsified NBR-latex. Different amounts of added hydrogenation catalyst (a) (HG2) and different amounts of added emulsifier (b) (KO) were employed.

TABLE 2

Hydrogenation of SDBS- and SDS-emulsified NBR-latex using HG2 catalyst and additional KO emulsifier. (8.3 MPa hydrogen, 120° C.).

| Experiment No. | B1 | B2 | B3 |
|---|---|---|---|
| Latex type | SDBS-latex | SDBS-latex | SDS-latex |
| Emulsifier in latex [phm] | 12.5 | 12.5 | 14.6 |
| (a) Hydrogenation catalyst [wt.-%] | 0.20 | 0.15 | 0.15 |
| (b) Added KO [wt.-%] | 0 | 17 | 16 |
| Reaction time [h] | Degree of hydrogenation [%] | | |
| 0.25 | 0.00 | 49.33 | 54.77 |
| 1 | 10.33 | 94.70 | 83.96 |
| 2 | 14.62 | 97.62 | 90.83 |
| 3 | 18.17 | 98.96 | 95.36 |
| 4 | 24.76 | 99.85 | 96.07 | wt.-% = weight percent based on the weight of the nitrile butadiene rubber solid content of the latex In the comparative experiment B1, the SDBS-emulsified NBR-latex was hydrogenated without addition of any emulsifier. The hydrogenation rate is slow even with a catalyst loading level of 0.2 wt.-% HG2 catalyst, which suggests that the HG2 catalyst could not penetrate the surfactant interfacial film and enter the particles emulsified by the SDBS surfactant.

In the experiments B2 and B3, KO was added as emulsifier (b) to the SDBS- or SDS-emulsified NBR-latex together with only 0.15 wt.-% HG2 as hydrogenation catalyst (a). As shown in Table 1, the addition of KO greatly improved the hydrogenation rate.

The SDBS/KO NBR-latex could reach about 95% within 1 hour and reach 99% within 4 hours.

The SDS/KO-emulsified NBR-latex was also found to have a rapid hydrogenation rate, which requires 3 hours to reach 95% (experiment B3). The hydrogenation rate of the SDS/KO-emulsified NBR-latex (experiment B3) is a little less than that of the SDBS/KO-emulsified NBR-latex (experiment B2).

Example 3: KO-Emulsified NBR-Latex+KO Added

Table 3 shows the results of the hydrogenation of KO-emulsified NBR-latex. Different amounts of added hydrogenation catalyst (a) (HG2) and different amounts of added emulsifier (b) (KO) were used.

TABLE 3

Hydrogenation of KO-emulsified NBR-latex with different amounts of added HG2 catalyst and different amounts of added KO emulsifier (8.3 MPa hydrogen, 120° C.).

| Experiment No. | C1 | C2 |
|---|---|---|
| Latex type | KO-latex (1) | KO-latex (1) |
| Emulsifier in latex [phm] | 2 | 2 |
| (a) Hydrogenation catalyst [wt.-%] | 0.3 | 0.3 |
| (b) Added KO [wt.-%] | 0.5 | 1 |
| Reaction time [h] | Degree of hydrogenation [%] | |
| 0.25 | 30.98 | 43.78 |
| 1 | 42.10 | 65.44 |
| 2 | 50.63 | 82.66 |
| 3 | 56.59 | 91.50 |
| 4 | 64.79 | 95.09 |
| 5 | 70.95 | 95.18 | wt.-% = weight percent based on the weight of the nitrile butadiene rubber solid content of the latex It is shown that the addition of 0.3 wt.-% HG2 catalyst and 1 wt.-% KO emulsifier to the KO-emulsified NBR-latex leads to a high hydrogenation rate with a hydrogenation degree of more than 95% within 4 h (experiment C2).

The addition of 0.3 wt.-% HG2 catalyst and only 0.5 wt.-% KO emulsifier to the KO-emulsified NBR-latex leads to a lower hydrogenation rate (experiment C1) compared to experiment C2.

Example 4: KO-Emulsified NBR-Latex (Different Amounts)+KO Added

Table 4 shows the results of the hydrogenation of KO-emulsified NBR-latex. The parent NBR-latex comprises different amounts of KO-emulsifier (2, 4, 8, 10 phm KO).

TABLE 4

Hydrogenation profiles of KO-emulsified NBR latex with different remaining amounts of KO emulsifier in the parent NBR-latex. (8.3 MPa hydrogen, 120° C., HG2 catalyst).

| Experiment No. | D1 | D2 | D4 | D5 |
|---|---|---|---|---|
| Latex type | KO-latex (1) | KO-latex (2) | KO-latex (3) | KO-latex (4) |
| Emulsifier in latex [phm] | 2 | 4 | 8 | 10 |
| (a) Hydrogenation catalyst [wt.-%] | 0.3 | 0.3 | 0.3 | 0.3 |
| (b) Added KO [wt.-%] | 1 | 1 | 1 | 1 |

TABLE 4-continued

Hydrogenation profiles of KO-emulsified NBR latex with different remaining amounts of KO emulsifier in the parent NBR-latex. (8.3 MPa hydrogen, 120° C., HG2 catalyst).

| Reaction time [h] | Degree of hydrogenation [%] | | | |
|---|---|---|---|---|
| 0.25 | 43.78 | 47.11 | 50.72 | 49.35 |
| 1 | 65.44 | 69.13 | 71.33 | 77.52 |
| 2 | 82.66 | 87.60 | 87.07 | 86.22 |
| 3 | 91.50 | 93.12 | 93.01 | 91.29 |
| 4 | 95.09 | 96.05 | 95.84 | 92.60 |
| 5 | 95.18 | 97.22 | 96.81 | 94.33 | wt.-% = weight percent based on the weight of the nitrile butadiene rubber solid content of the latex The hydrogenation rate is not significantly effected by the amount of emulsifier present during the NBR-latex synthesis.

Although the KO-emulsifier, which was present in the NBR-parent latex increases from 2 to 10 phm, the degree of hydrogenation is comparable for all experiments D1 to D4 and after 3 hours, the degree of hydrogenation is >90% for all nitrile rubbers.

In view of examples 3, the amount of added KO has a more significant effect on the hadrogenation rate than the amount of emulsifiere already present in the parent NBR-latex.

Example 5. KO-Emulsified NBR-Latex+KO Added (Different Amounts)

Table 5 shows the results of the hydrogenation of KO-emulsified NBR-latex. Different amounts of added emulsifier (KO) were used.

TABLE 5

Hydrogenation profiles of KO-emulsified NBR-latex with different KO addition amounts prior to the hydrogenation (8.3 MPa hydrogen, 120° C., HG2 catalyst).

| Experiment No. | E1 | E2 | E3 |
|---|---|---|---|
| Latex type | KO-latex (5) | KO-latex (5) | KO-latex (5) |
| Emulsifier in latex [phm] | 6 | 6 | 6 |
| (a) Hydrogenation catalyst [wt.-%] | 0.2 | 0.2 | 0.2 |
| (b) Added KO [wt.-%] | 13 | 27 | 40 |
| Reaction time [h] | Degree of hydrogenation [%] | | |
| 0.25 | 46.05 | 63.09 | 70.03 |
| 1 | 57.11 | 69.39 | 78.58 |
| 2 | 59.51 | 72.96 | 83.71 |
| 3 | 64.59 | 77.70 | 86.21 |
| 4 | 68.33 | 79.16 | 87.94 |
| 5 | 72.85 | 80.54 | 89.84 | wt.-% = weight percent based on the weight of the nitrile butadiene rubber solid content of the latex Addition of KO-emulsifier has a considerable effect on the hydrogenation rate. The hydrogenation rate increases with increasing amounts of added KO emulsifier.

Large amounts of emulsifier of 13 to 40 wt.-% can be added without impeding the NBR-latex hydrogenation reaction.

Example 6: KO-Emulsified NBR-Latex+SDS Added

Table 6 shows the results of the hydrogenation of KO-emulsified NBR-latex. Different amounts of added emulsifier (SDS) were used. The SDS surfactant was tested for the hydrogenation reactions.

TABLE 6

Effect of added SDS as additional emulsifier for the hydrogenation using HG2 catalyst. KO-emulsified NBR-latex mith 14.6 phm KO-emulsifiere was used as substrate. (8.3 MPa hydrogen, 120° C., HG2 catalyst,).

| Experiment No. | F3 | F2 | F1 |
|---|---|---|---|
| Latex type | KO-latex (6) | KO-latex (6) | KO-latex (6) |
| Emulsifier in latex [phm] | 14.6 | 14.6 | 14.6 |
| (a) Hydrogenation catalyst [wt.-%] | 0.05 | 0.05 | 0.05 |
| (b) Added SDS [wt.-%] | 2.5 | 5 | 13 |
| Reaction time [h] | Degree of hydrogenation [%] | | |
| 0.25 | 37.20 | 35.11 | 28.20 |
| 1 | 40.26 | 42.58 | 43.71 |
| 2 | 43.66 | 45.71 | 47.42 |
| 3 | 43.91 | 47.15 | 50.60 |
| 4 | 45.98 | 54.88 | 56.08 |
| 5 | 55.68 | 57.66 | 62.12 | wt.-% = weight percent based on the weight of the nitrile butadiene rubber solid content of the latex As shown in Table 6, the addition of increasing amounts of SDS leads to increasing hydrogenation rates. For all of these experiments, the conversion is less than 65%, which indicates that the addition KO emulsifier (as used in experiments Z2-Z5) is more beneficial to increase the hydrogenation rate of KO-emulsifies NBR-latex using HG2 than SDS emulsifier.

The invention claimed is:

1. A process for preparing a hydrogenated nitrile butadiene rubber latex comprising subjecting unsaturated or partially saturated nitrile butadiene rubber latex which is present in aqueous suspension to a hydrogenation in the presence of at least one hydrogenation catalyst (a) and at least one emulsifier (b), wherein the hydrogenation catalyst (a) and the emulsifier (b) are added to the aqueous suspension of the nitrile butadiene rubber, and wherein the at least one emulsifier (b) is an alkali metal salt or ammonium salt of fatty acids, of alkyl sulfates, of sulfuric monoesters of ethoxylated alkanols, of ethoxylated alkylphenols, of alkylsulfonic acids and of alkylarylsulfonic acids, ethoxylated mono, di- and trialkylphenol or ethoxylated fatty alcohol; alkali metal salt or ammonium salt of mono- or di-$C_4$-$C_{24}$ alkyl derivatives of bis(phenylsulfonic acid)ether; alkali metal salt or ammonium salt of alkylarylsulfonic acids, alkylsulfonic acids, and of the sulphuric monoester of ethoxylated alkanols.

2. The process according to claim 1, wherein the hydrogenation catalyst (a) is at least one noble metal complex hydrogenation catalyst.

3. The process according to claim 1, wherein the hydrogenation catalyst (a) is at least one ruthenium complex hydrogenation catalyst.

4. The process according to claim 1, wherein the hydrogenation catalyst (a) is at least one catalyst of the general formula (A)

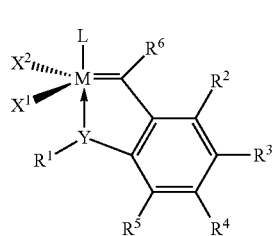

(A)

wherein
M is ruthenium or osmium,
Y is oxygen (O), sulphur (S),
$X^1$ and $X^2$ are identical or different ligands,
$R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl, $CR^{13}C(O)R^{14}$ or alkylsulphinyl radical, each of which may or may not be substituted by one or more alkyl, halogen, alkoxy, aryl or heteroaryl radicals,
$R^2$, $R^3$, $R^4$ and $R^5$ are identical or different and are each hydrogen, organic or inorganic radicals,
$R^6$ is hydrogen or an alkyl, alkenyl, alkynyl or aryl radical,
$R^{13}$ is hydrogen or alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may or may not be substituted by one or more alkyl, halogen, alkoxy, aryl or heteroaryl radicals;
$R^{14}$ is alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may or may not be substituted by one or more alkyl, halogen, alkoxy, aryl or heteroaryl radicals; and
L is a ligand.

5. The process according to claim 4, wherein the hydrogenation catalyst (a) of the general formula (A) is used wherein
M is Ruthenium,
Y is oxygen,
$X^1$ and $X^2$ represent chlorine, $CF_3COO$, $CH_3COO$, $CFH_2COO$, $(CH_3)_3CO$, $(CF_3)_2(CH_3)CO$, $(CF_3)(CH_3)_2CO$, phenoxy, methoxy, ethoxy, tosylate (p-$CH_3$—$C_6H_4$—$SO_3$), mesylate ($CH_3SO_3$) or trifluoromethanesulfonate ($CF_3SO_3$),
$R^1$ is $C_3$-$C_{20}$-cycloalkyl, $C_6$-$C_{24}$-aryl or a straight-chain or branched $C_1$-$C_{30}$-alkyl radical, with the latter being or being not interrupted by one or more double or triple bonds or one or more heteroatoms, preferably oxygen or nitrogen, and
$R^2$, $R^3$, $R^4$, $R^5$ are identical or different and are each hydrogen, halogen, nitro, $CF_3$, $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl which may or may not in each case be substituted by one or more $C_1$-$C_{30}$-alkyl, $C_1$-$C_{20}$-alkoxy, halogen, $C_6$-$C_{24}$-aryl or heteroaryl radicals.

6. The process according to claim 1, wherein the at least one hydrogenation catalyst (a) is selected from the group consisting of catalysts of structure (A1), (B1), (C1), (D1) and (E1):

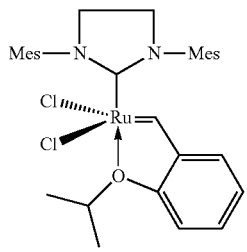
(A1)

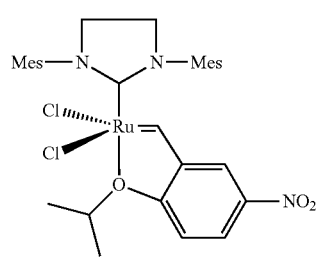
(B1)

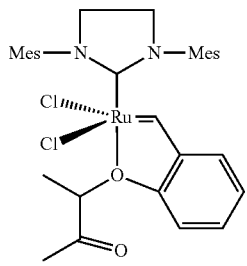
(C1)

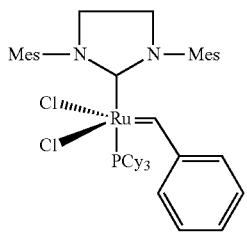
(D1)

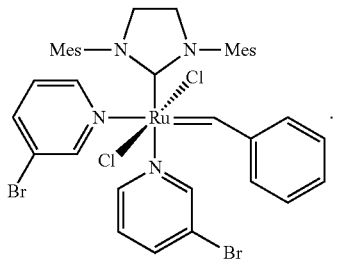
(E1)

7. The process according to claim 1, wherein the at least one hydrogenation catalyst (a) is used in an amount from 0.005 to 5.0 wt.-% based on the weight of the nitrile butadiene rubber solid content of the latex.

8. The process according to claim 1, wherein the at least one emulsifier (b) is potassium oleate, sodium oleate, sodium dodecyl benzene sulfonate or sodium dodecyl sulfate.

9. The process according to claim 1, wherein the amount of the at least one added emulsifier (b) is in the range from 0.1 to 50.0 wt.-% based on the weight of the nitrile butadiene rubber solid content of the latex.

10. The process according to claim 1, wherein the hydrogenation is carried out at a temperature in the range of from 60° C. to 200° C.

11. The process according to claim 1, wherein the hydrogenation is carried out at a hydrogen pressure in the range of 0.5 MPa to 35 MPa.

12. The process according to claim 1, which is performed in the absence of any organic solvent.

13. The process according to claim 1, wherein the hydrogenation catalyst (a) and the emulsifier (b) are added directly to the nitrile butadiene rubber latex to be hydrogenated.

14. Hydrogenated nitrile rubber latex obtained by the process according to claim 1, comprising 2 to 20 wt.-% emulsifier based on the solid content of the HNBR-latex.

* * * * *